Jan. 6, 1925.

H. R. SCHMITZ

FRICTION WHEEL

Filed May 6, 1924

1,522,332

2 Sheets-Sheet 1

Inventor

H. R. Schmitz

By Clarence A. O'Brien

Attorney

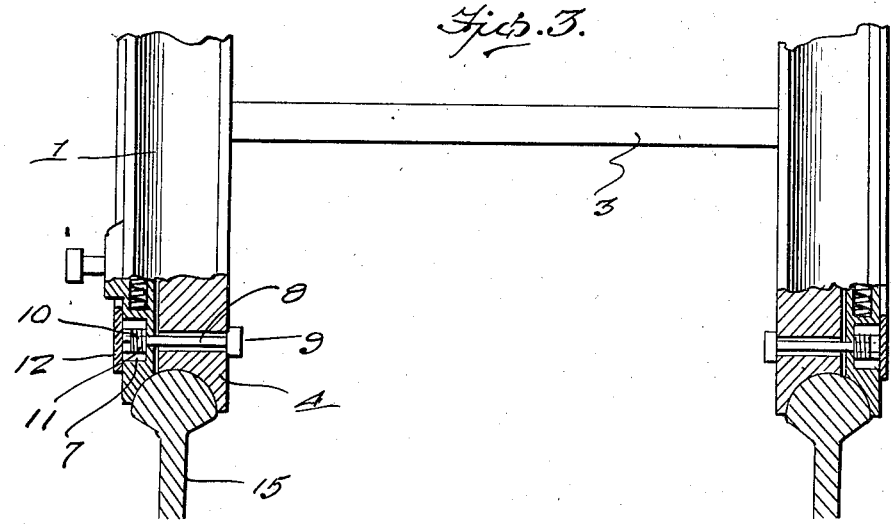
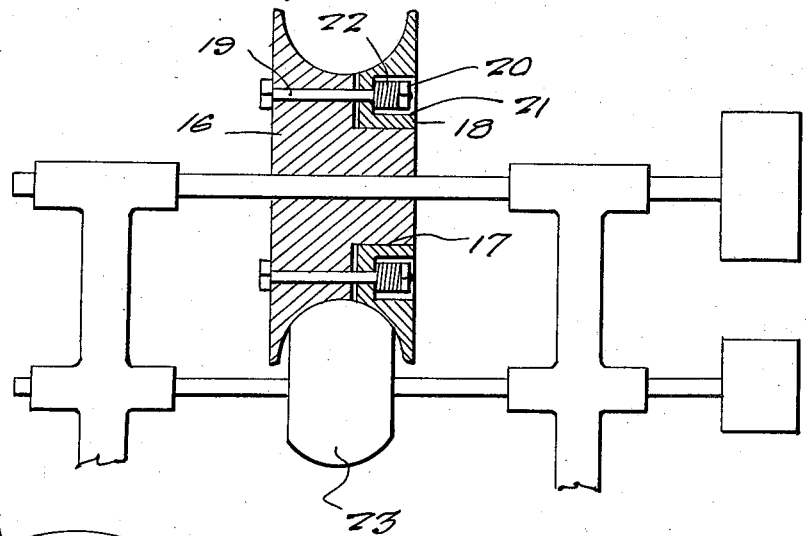
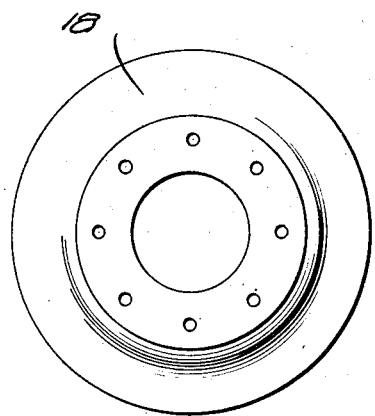

Patented Jan. 6, 1925.

1,522,332

UNITED STATES PATENT OFFICE.

HERMAN R. SCHMITZ, OF BOULDER, MONTANA.

FRICTION WHEEL.

Application filed May 6, 1924. Serial No. 711,457.

*To all whom it may may concern:*

Be it known that I, HERMAN R. SCHMITZ, a citizen of the United States, residing at Boulder, in the county of Jefferson and State of Montana, have invented certain new and useful Improvements in Friction Wheels, of which the following is a specification.

This invention relates to friction wheels and it consists in the novel features hereinafter described and claimed.

An object of the invention is to provide a wheel of the character stated which is especially adapted to be used upon locomotives although the same form of wheel may be used to advantage and applied to other machines and devices.

Another object of the invention is to provide a wheel structure including a portion having its peripheral surface fixed with relation to the axle or shaft upon which the wheel is mounted and a part resiliently supported upon the said fixed portion, the said part having a peripheral surface adapted to have contact with aerial or pulley whereby the frictional contact between the wheel structure and the rail or pulley is increased or intensified.

A further object of the invention is to provide in a wheel structure of the character stated, a grooved peripheral tread which provides opposed surfaces adapted to lie or move at the opposite sides of the heads of rails and thus serve to hold the rails in proper alinement and prevent rail spreading.

In the accompanying drawings:—

Figure 1:
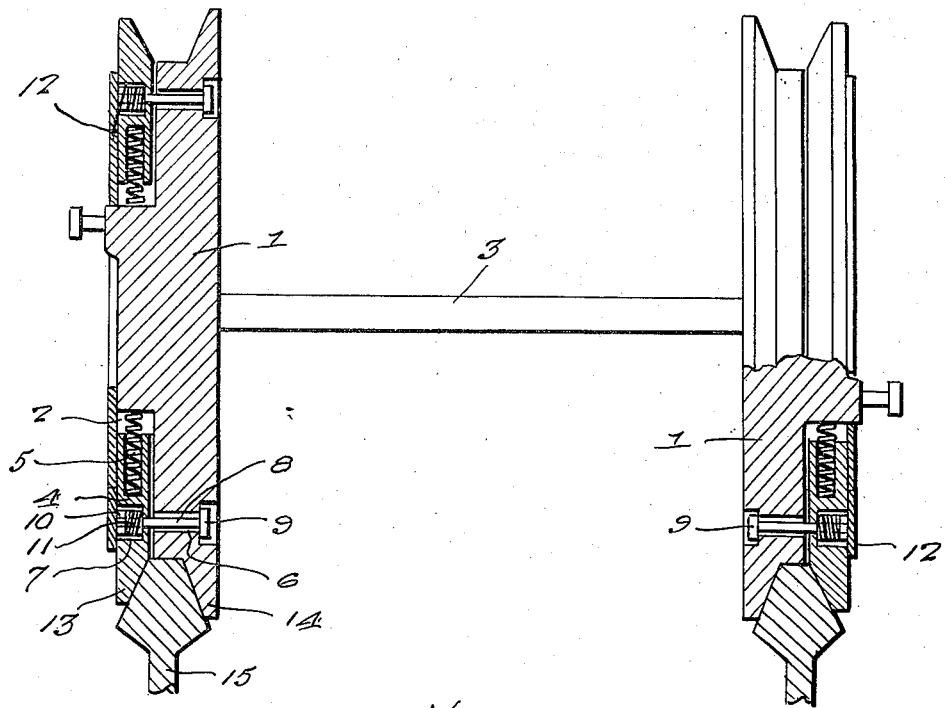
Figure 2:
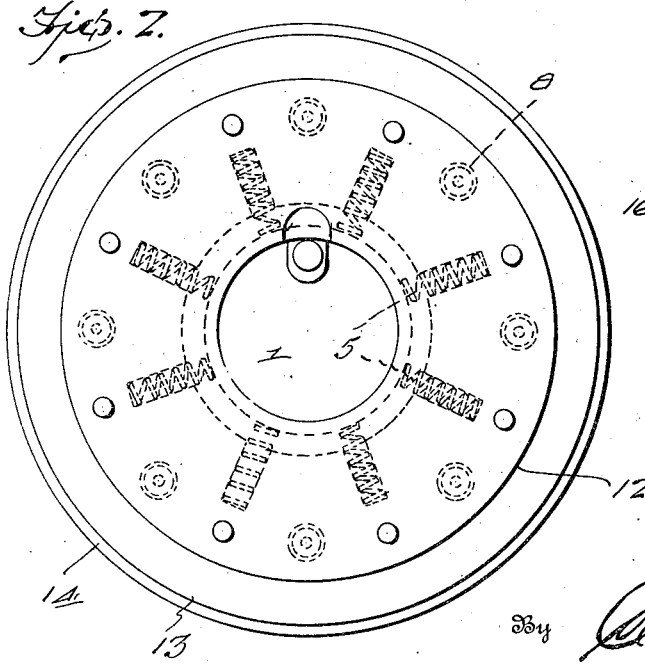
Figure 6:
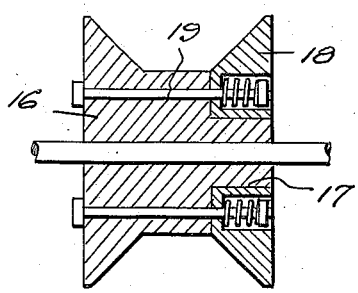

Figure 1 is a transverse sectional view of a pair of locomotive drive wheels mounted upon track rails, Figure 2 is a side elevation of the drive wheels shown in Figure 1, Figure 3 is a fragmentary side elevation of a modified form of the drive wheel showing parts thereof in section, Figure 4 is a transverse sectional view of another modified form of the friction wheel showing the same co-operating with a pulley, Figure 5 is a side elevation of a ring which forms a part of the wheel structure as shown in Figure 4, Figure 6 is a transverse sectional view of still another form of the friction wheel.

In the form of the invention as illustrated in Figures 1 and 2 of the drawing, the same includes a circular body 1 provided at its inner side with an annular recess 2. The bodies 1 of the two wheels are mounted upon an axle 3 in a usual manner. A ring 4 is seated in the recess 2 and the inner edge of the ring is spaced from the inner wall of the recess 2. Springs 5 are interposed between the ring 4 and the inner wall of the recess 2 and the outer ends of the said springs are received in sockets provided in the ring 4. The springs 5 are radially disposed with relation to the body 1. The ring 4 is provided with a number of transversely disposed openings 6. The body 1 is provided at its outer side and in the vicinity of its periphery with a series of sockets 7 which register with the openings 6. Bolts 8 pass through the openings 6 and enter the sockets 7 and the heads 9 of the bolts 8 close the inner ends of the openings 6. Nuts 10 are screwed upon the outer ends of the bolts 8 and springs 11 are interposed between the nuts 10 and the inner walls of the sockets 7. An annular dust plate 12 is applied to the outer surface of the wheel structure and covers the outer end of the sockets 7 and prevents the entrance of dust therein. The body 1 and the ring 4 are provided at their edges with flanges 13 and 14, respectively, which are spaced from each other and which are adapted to move or travel at the opposite sides of the head of a track rail 15. The periphery of the ring 4 travels upon the upper surface of the head of the rail 15. Therefore, as the wheel moves over the rail, the wheel body 1 is resiliently supported upon the rail and the flanges of the bodies and the rings of the two wheels which are attached to the axle 3 will prevent the rails of the track from spreading.

In the form of the invention as illustrated in Figure 3 of the drawings the arrangement of construction of the parts is substantially the same as that shown and described with the arrangement and construction shown in Figures 1 and 2 with the exception that the rails 15 as employed in the structure as shown in Figure 3 are provided with heads having curved upper surfaces which are received in the grooves of the wheels, the said grooves being curved transversely to fit the upper surfaces of the heads of the rails.

In the form of the invention as illustrated in Figures 4 and 5 of the drawings, the same includes a wheel body 16 having an annular recess 17 at one side. A ring 18 is seated in the recess 17 and the inner surface of the ring fits snugly against the inner wall of the recess. Bolts 18 pass transversely through the body 16 and the ring and nuts 20 are screwed upon the bolts 19 and are received in sockets 21 provided in the ring. Springs 22 are interposed between the nuts 20 and the bottom walls of the sockets. In this form of the invention the wheel is adapted to travel upon the convex surface of a pulley 23. In this form of the wheel the peripheral groove thereof is concaved transversely and fits snugly upon the pulley and consequently the frictional contact between the wheel and the pulley is increased.

In the form of the wheel as shown in Figure 6 of the drawings, the arrangement of the parts and features is substantially the same as the arrangement shown in Figure 4 of the drawings, with the exception that the groove which is provided at the periphery of the wheel is provided with a series of angularly disposed surfaces, one of the said surfaces, that is to say the intermediate surface is in the form of a cylinder and the side surfaces of the groove diverge from each other and from the said cylindrical surface to the end of the wheel.

Having described the invention, what is claimed is:—

1. A wheel structure comprising a body provided at its side with an annular recess, a ring seated in the recess, the body being provided at its outer side with sockets, bolts passing through the ring and being loosely received in the sockets, the ends of the bolts entering the sockets, nuts screwed upon the bolts and housed within the socket, springs interposed between the bolts and the inner walls of the sockets and a ring closing the outer ends of all of the sockets.

2. A wheel comprising a body provided at its sides with an annular recess, a ring seated in the recess, the ring and the body having spaced peripheral flanges, the ring being provided with sockets, bolts passing transversely through the body and entering the socket, nuts screwed upon the bolts and housed within the socket, and springs interposed between the nuts and the inner walls of the sockets.

In testimony whereof I affix my signature.

HERMAN R. SCHMITZ.